United States Patent Office 3,359,320
Patented Dec. 19, 1967

3,359,320
NOVEL HALOGENATED SULFIDES
Louis G. Anello, Basking Ridge, and Richard F. Sweeney, Dover, Randolph Township, N.J., assignors to Allied Chemical Corporation, New York, N.Y., a corporation of New York
No Drawing. Filed Apr. 5, 1965, Ser. No. 445,709
19 Claims. (Cl. 260—586)

This invention relates to the production of a novel class of unsaturated, alicyclic, halogen-containing ketone sulfides.

An object of this invention is to provide a novel class of chemical compounds and more particularly to provide a class of perhalocyclopentenone and cyclohexenone(2-hydroperhalocyclopentenone and cyclohexenone) sulfides, hereinafter referred to as sulfides, which sulfides are characterized by the presence of a single hydrogen atom substituted on one of the unsaturated carbon atoms, all of the remaining unsatisfied valences of the saturated and unsaturated carbon atoms in the molecule being taken up by either fluorine or chlorine atoms, there being present at least one fluorine atom and one chlorine atom in the molecule.

Another object of the invention is to provide a process for the production of the above-described sulfides.

Other objects and advantages of the invention will become apparent from a consideration of the following description and discussion of the subject invention.

The novel sulfides of the invention may be represented by the following formula:

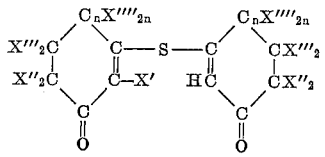

wherein $X'-X''''$ may be F or Cl and may be the same or different provided that there is present at least one fluorine atom and one chlorine atom in the molecule, and $n$ may be 0 or 1.

It has been found that the above-described sulfides are useful as solvents for polymers, terpolymers and copolymers of trifluorochloroethylene and as sealing adjuvants for films of such polymers.

The novel sulfides are also useful as intermediates for the preparation of other compounds, such as synthetic resins and polymers and additionally may be used as a means of introducing fluorocarbon radicals into compounds of various structures, thereby imparting valuable characteristics thereto.

The sulfides of the invention may be prepared by reacting a perhalocycloalkenone of the formula:

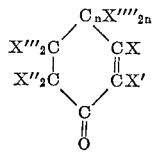

wherein $X-X''''$ may be F or Cl and may be the same or different provided that there is present at least one fluorine atom and one chlorine atom within $X'-X''''$, and $n$ may be 0 or 1, with a thiol of the formula:

R—SH wherein R is an aryl radical selected from the group consisting of phenyl, phenylalkyl and alkylphenyl radicals.

There is no criticality in the number of carbon atoms which may be contained in the aryl radical R. The only limitation is the practical one of stability of the resulting thiol molecule in the reaction medium to be employed. Because of resulting stability and ease of preparation, aryl radicals of the type indicated which possess from 6–12 carbon atoms, inclusive, are preferred.

The reaction may be carried out with or without a solvent. If a solvent is employed, any of the well known inert polar solvents may be used, dioxane, diglyme and dimethylformamide, being exemplary.

The reaction may be illustrated by the following equation:

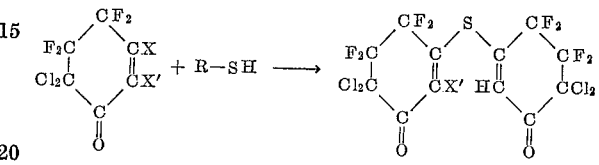

wherein X and X' may be F or Cl and R is as defined above.

The reaction mechanism for the above equation is not understood and it is not comprehended how the indicated products are formed. It is observed, however, that the sulfur bonding takes place at the unsaturated carbon atoms which are in a beta position to the ketone group. This will be the case regardless of whether X is a fluorine atom and X' is a chlorine atom, or vice-versa.

Where other perhalocyclohexenone(2-hydroperhalocyclohexenone) sulfides and the corresponding perhalocyclopentenone(2 - hydroperhalocyclopentenone) sulfides are desired, the corresponding perhalocycloalkenones are employed as starting materials and the reaction proceeds substantially in the same way.

The perhalocycloalkenone starting materials may be prepared by reacting the corresponding perhalocycloalkene with sulfur trioxide in the presence of a boron or pentavalent antimony compound catalyst at temperatures between about 50–100° C., as substantially disclosed and claimed in co-pending, commonly assigned application of Richard F. Sweeney et al., Ser. No. 373,058, filed June 5, 1964, now Patent No. 3,333,002.

The thiol reactants (R—SH) may be prepared, as is known in the art, by the reaction of the corresponding aryl halides with sodium or potassium hydrosulfide. Alternatively, such materials may be prepared indirectly by reaction of the corresponding aryl halides with thiourea to produce the corresponding S-aryl isothiouronium salts, which in turn may be hydrolyzed to the corresponding thiols, with NaOH.

The reaction of the invention may be carried out in conventional vessels constructed of ordinary materials, such as Pyrex or steel, which vessels are preferably equipped with stirring means, condensing means and means for adding the thiol reactant slowly, such as a dropping funnel.

The process affords the advantages of operation at atmospheric pressures and at low temperatures. Superatmospheric or subatmospheric pressures may be employed, however, with no particular benefit.

The reaction may be carried out over a relatively wide range of temperatures. Those temperatures between about room temperature and the reflux temperature of the reaction mixture are generally preferred, although temperatures above and below this range are operable. Optimum reaction temperatures lie between about 100° C. and the reflux temperature of the reaction mixture.

Stoichiometry of the reaction requires two moles of perhalocycloalkenone starting material per mole of thiol reactant. The reaction will proceed with molar ratios of reactants above or below the 2:1 ratio, however, with proportionately diminished yields based upon the reactant present in excess.

The products may be purified and recovered by ordinary laboratory procedures, such as fractional distillation.

The products and process of the invention are further illustrated by the following examples in which parts and percentages are by weight unless otherwise indicated.

EXAMPLE 1

A 100 ml. Pyrex flask, equipped with a reflux condenser, dropping funnel, thermometer and stirrer was charged with 82 g. (0.30 mole) of 2,3-dichlorohexafluoro-2-cyclohexenone (B.P. 135° C.) and 38 g. (0.31 mole) of benzenemethanethiol (B.P. 194° C.). The mixture was heated to 135° C. and refluxed for about 64 hours during which time the temperature rose to about 147° C. At the end of this period, the reaction product mixture was fractionally distilled and there were recovered 44 g. (0.17 mole) of 2,3-dichlorohexafluoro-2-cyclohexenone starting material, 8 g. (0.06 mole) of benzenemethanethiol reactant, 9 g. of a forecut and 12 g. of a high boiler. The high boiler was redistilled, purified and identified as being substantially 2-chloro-3-oxohexafluoro-1-cyclohexene(benzylthio)sulfide, as described in Example 1 of co-pending, commonly assigned application of Louis G. Anello and Richard F. Sweeney, Ser. No. 445,711, filed Apr. 5, 1965. The forecut was redistilled on a small spinning band column to give 3.4 g. of a red-colored oil boiling between 85–88° C./1 mm. The red-colored oil was purified by means of gas chromatography and was identified by analysis to be 2-chloro-3-oxohexafluoro-1-cyclohexene(2 - hydro - 3-oxohexafluoro-1-cyclohexene)sulfide.

*Analysis.*—Calculated for $C_{12}ClF_{12}HO_2S$: C, 30.51%; S, 6.78%; Cl, 7.52%; F, 48.31%. Found: C, 31.72%; S, 6.48%; Cl, 7.4%; F, 48.78%.

Infrared spectrographic analysis showed a carbonyl absorption band at 5.8 microns, an —SC=CCl absorption band at 6.35, an —SC=CH absorption band at 6.45 microns and a hydrogen absorption band at 3.3 microns, thus substantiating the postulated structure.

EXAMPLE 2

A 100 ml. Pyrex flask, equipped with a reflux condenser, dropping funnel, thermometer and stirrer is charged with 67 g. (0.30 mole) of 2,3-dichlorotetrafluoro-2-cyclopentenone (B.P. 127° C.) and 38 g. (0.31 mole) of benzenemethanethiol (B.P. 194° C.). The mixture is heated to about 127° C. and refluxed for about 64 hours during which time the temperature rises to about 139° C. At the end of this reaction period, the reaction product mixture is fractionally distilled to effect recovery of about 38 g. (0.17 mole) of 2,3-dichlorotetrafluoro-2-cyclopentenone, about 8 g. (0.06 mole) of benzenemethanethiol reactant, about 9.5 g. of a high boiler and about 7 g. of forecut. The high boiler is redistilled, purified and identified as being substantially 2-chloro-3-oxotetrafluoro-1-cyclopentene(benzylthio)sulfide, as described in Example 2 of co-pending application Ser. No. 445,711, noted supra. The forecut is redistilled on a small spinning band column to give about 4.3 g. of a red-colored oil. The red-colored oil is purified by means of gas chromatography and is identified by analysis to be 2-chloro-3-oxotetrafluoro-1-cyclopentene(2 - hydro-3-oxotetrafluoro-1-cyclopentene)sulfide.

EXAMPLES 3–9

The process of Example 1 is repeated with the reactants listed in the indicated columns of Table I. The corresponding sulfide products obtained are listed oppositely. In all of the examples, approximately at 2:1 molar ratio of perhalocycloalkenone starting material to thiol reactant is employed.

*Table I*

| Examples | Perhalocycloalkenone Reactant | Thiol Reactant | Sulfide Product |
|---|---|---|---|
| 3 | 2,3,4,4-tetrachlorotetrafluoro-2-cyclohexenone | Benzenethiol | 2,6,6-trichloro-3-oxotetrafluoro-1-cyclohexene(6,6-dichloro-2-hydro-3-oxotetrafluoro-1-cyclohexene) sulfide. |
| 4 | 2,3,4,4,6,6-hexachlorodifluoro-2-cyclohexenone | Benzeneethanethiol | 2,4,4,6,6-pentachloro-3-oxodifluoro-1-cyclohexene(4,4,6,6-tetrachloro-2-hydro-3-oxodifluoro-1-cyclohexene) sulfide. |
| 5 | 3,4,4-trichlorotrifluoro-2-cyclopentenone | Benzenehexanethiol | 5,5-dichloro-3-oxotrifluoro-1-cyclopentene(5,5-dichloro-2-hydro-3-oxodifluoro-1-cyclopentene) sulfide. |
| 6 | 4,4-dichlorotetrafluoro-2-cyclopentenone | 4-ethylbenzenemethanethiol | Do. |
| 7 | 3,4,4,5,5-pentachloromonofluoro-2-cyclopentenone | 1,4-dimethylbenzenepropanethiol | 4,4,5,5-tetrachloro-3-oxomonofluoro-1-cyclopentene (4,4,5,5-tetrachloro-2-hydro-3-oxo-1-cyclopentene) sulfide. |
| 8 | 2,5,5-trichlorotrifluoro-2-cyclopentenone | α-Cumenethiol | 2,4,4-trichloro-3-oxodifluoro-1-cyclopentene(4,4-dichloro-2-hydro-3-oxodifluoro-1-cyclopentene) sulfide. |
| 9 | 2,3,4,5-tetrachlorodifluoro-2-cyclopentenone | 3-Butylbenzenethiol | 2,4,5-trichloro-3-oxodifluoro-1-cyclopentene(4,5-dichloro-2-hydro-3-oxodifluoro-1-cyclopentene) sulfide. |

EXAMPLE 10

2 - chloro - 3-oxohexafluoro-1-cyclohexene(2-hydro-3-oxohexafluoro - 1 - cyclohexene)sulfide, 2-chloro-3-oxotetrafluoro - 1 - cyclopentene(2-hydro-3-oxotetrafluoro-1 - cyclopentene)sulfide and 2,6,6-trichloro-3-oxotetrafluoro - 1 - cyclohexene(6,6-dichloro-2-hydro-3-oxotetrafluoro-1-cyclohexene)sulfide are tested as sealing adjuvants for strips of thermoplastic film composed of a copolymer of about 96% trifluorochloroethylene and about 4% vinylidene fluoride. Saturated solutions of this polymer in the respective sulfides are prepared by separately refluxing the sulfides with said polymers, cooling the resulting mixtures to room temperature and decanting the respective solutions from the undissolved polymer. A pair of polymer film strips is sealed together without the use of sealing adjuvant. Three more pairs of polymer film strips are sealed together, this time employing as sealing adjuvants each of the above-described polymer solutions in the various sulfides. The sealing adjuvants are applied by merely coating, as by brushing, the inner surfaces of the film strips to be sealed. An impulse heat sealer is used. The impulse heat sealer is a Sentinel Impulse Sealer manufactured by Packaging Industries, Inc. of Montclair, N.J. Sealing pressure is 30 p.s.i. The heat sealing temperature is 400° F. The dwell time for the seal, or in other words, the length of time during which the pressure and heat are applied to effect the seal, is three (3) seconds. The seal strength is tested by measuring the amount of force need to rupture or pull apart the seal. As can be seen from the following table, the polymer film strip pairs sealed with the adjuvant solutions, rupture at weights considerably higher than the polymer film strip pair which is sealed without the use of sealing adjuvant.

Table II

| | Weight to effect rupture, g. |
|---|---|
| Film strips heat-sealed without the use of adjuvant | <346 |
| Film strips heat-sealed with a polymer solution in 2 - chloro - 3-oxohexafluoro-1-cyclohexene(2-hydro-3-oxohexafluoro-1-cyclohexene)sulfide | >800 |
| In 2 - chloro - 3-oxotetrafluoro-1-cyclopentene(2-hydro-3-oxotetrafluoro-1-cyclopentene)sulfide | >800 |
| In 2,6,6-trichloro - 3-oxotetrafluoro-1-cyclohexene (6,6 - dichloro-2-hydro-3-oxotetrafluoro-1-cyclohexene)sulfide | >800 |

Although a copolymer of about 96% trifluorochloroethylene and about 4% vinylidene fluoride is employed in the above examples, a wide variety of polymers, terpolymers and copolymers of trifluorochloroethylene may be employed with equivalent results; homopolymeric trifluorochloroethylene and copolymers of trifluorochloroethylene with vinyl chloride, 1,1-chlorofluoroethylene, trifluoroethylene and perfluorobutadiene being exemplary. In general, most suitable are those compositions containing upwards of 50% by weight of trifluorochloroethylene. The general class of compositions described above can be referred to generically as polytrifluorochloroethylene.

When other sulfide products within the scope of the invention, such as those additional ones listed in the last column of Table I, are used as sealing adjuvants for films of polytrifluorochloroethylene, substantially the same results are obtained; that is to say, films of polytrifluorochloroethylene which are heat sealed employing such adjuvants rupture at weights considerably higher than films of polytrifluorochloroethylene which are heat sealed without using sealing adjuvants.

Since various changes and modifications may be made without departing from the spirit of the invention, the invention is to be limited only by the scope of the appended claims.

We claim:

1. Compounds of the formula:

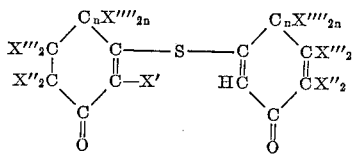

wherein X′–X′′′′ may be F or Cl and may be the same or different provided that there is present at least one fluorine atom and one chlorine atom in the molecule and $n$ may be 0 or 1.

2. Compounds according to claim 1 in which $n$ is 0.
3. Compounds according to claim 1 in which $n$ is 1.
4. Compounds of the formula:

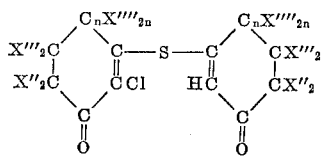

wherein X″–X″ may be F or Cl and may be the same or different provided that there is present at least one fluorine atom in the molecule and $n$ may be 0 or 1.

5. Compounds according to claim 4 in which $n$ is 0.
6. Compounds according to claim 4 in which $n$ is 1.
7. 2 - chloro-3-oxohexafluoro-1-cyclohexene(2-hydro-3-oxohexafluoro-1-cyclohexene)sulfide.
8. 2 - chloro-3-oxotetrafluoro-1-cyclopentene(2-hydro-3-oxotetrafluoro-1-cyclopentene)sulfide.
9. 2,6,6-trichloro-3-oxotetrafluoro-1-cyclo - hexene(6,6-dichloro - 2-hydro-3-oxotetrafluoro-1-cyclohexene)sulfide.
10. The process which comprises reacting a compound of the formula:

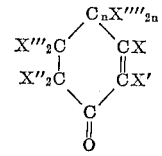

wherein X–X′′′′ may be F or Cl and may be the same or different provided that there is present at least one fluorine atom and one chlorine atom within X′–X′′′′, and $n$ may be 0 or 1, with a compound of the formula:

R—SH wherein R is an aryl radical selected from the group consisting of phenyl, phenylalkyl and alkylphenyl radicals at a temperature from about room temperature to about the reflux temperature of the reaction mixture.

11. A process according to claim 10 in which $n$ is 0.
12. A process according to claim 10 in which $n$ is 1.
13. The process which comprises reacting a compound of the formula:

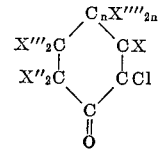

wherein X and X″–X′′′′ may be F or Cl and may be the same or different provided that there is present at least one fluorine atom within X″–X′′′′, and $n$ may be 0 or 1, with a compound of the formula:

R—SH wherein R is an aryl radical selected from the group consisting of phenyl, phenylalkyl and alkylphenyl radicals at a temperature from about room temperature to about the reflux temperature of the reaction mixture.

14. A process according to claim 13 in which $n$ is 0.
15. A process according to claim 13 in which $n$ is 1.
16. The process which comprises reacting 2,3-dichlorohexafluoro-2-cyclohexenone with benzenemethanethiol at a temperature from about room temperature to about the reflux temperature of the reaction mixture.
17. The process of claim 16 in which the reaction is carried out at temperatures in the range of 100–135° C.
18. The process which comprises reacting 2,3-dichlorotetrafluoro-2-cyclopentenone with benzenemethanethiol at a temperature from about room temperature to about the reflux temperature of the reaction mixture.
19. The process which comprises reacting 2,3,4,4-tetrachlorotetrafluoro-2-cyclohexenone with benzenethiol at a temperature from about room temperature to about the reflux temperature of the reaction mixture.

References Cited

Weil et al., "J. Org. Chem.," vol. 28(9), pp. 2218–25 (1963) QD241.J6.

LEON ZITVER, *Primary Examiner.*

M. JACOB, *Assistant Examiner.*

UNITED STATES PATENT OFFICE
CERTIFICATE OF CORRECTION

Patent No. 3,359,320                          December 19, 1967

Louis G. Anello et al.

It is hereby certified that error appears in the above numbered patent requiring correction and that the said Letters Patent should read as corrected below.

Column 4, line 19, for "at" read -- a --; column 5, line 61, for "$X''-X''$" read -- $X''-X''''$ --.

Signed and sealed this 21st day of January 1969.

(SEAL)
Attest:

Edward M. Fletcher, Jr.                      EDWARD J. BRENNER
Attesting Officer                             Commissioner of Patents